United States Patent Office 3,330,257
Patented July 11, 1967

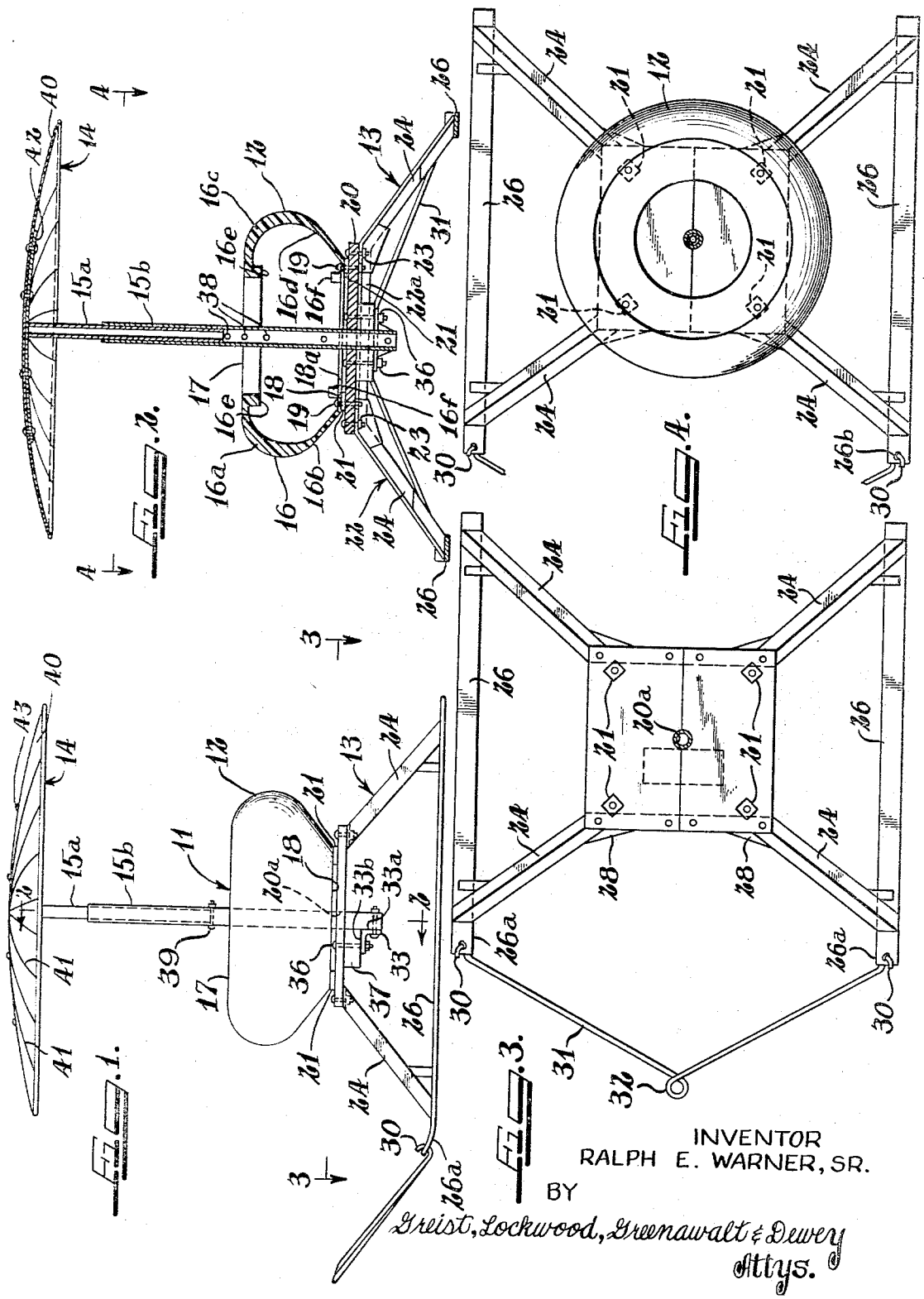

3,330,257
LIVESTOCK FEEDER
Ralph Eugene Warner, Sr., 206 N. Ora,
Pryor, Okla. 74261
Filed Nov. 26, 1965, Ser. No. 514,756
5 Claims. (Cl. 119—61)

This application is a continuation-in-part of my copending application Ser. No. 398,972, filed Sept. 24, 1964, now abandoned, and entitled "Livestock Feeder."

The present invention relates to improvements and innovations in livestock feeders. More particularly, this invention concerns a novel portable livestock feeder which is equipped with a unique feed receptacle and with means for facilitating relocation of the feeder.

Range feeders are commonly employed as a means of providing livestock with ready access to dietary supplements, such as minerals, protein blocks, and the like. In addition, these devices function to induce cattle and other livestock to graze over wider areas thereby making more uniform use of available grazing land. While a number of range feeder constructions have been proposed, none of these has been completely satisfactory. For example, one of the objections to these prior art feeders is that they generally employ straight-walled feed receptacles which the cattle find difficult to eat from, particularly when the level of feed ration contained therein becomes low. Another objection with such receptacles is that the feed tends to be spilled out by the cattle as they eat therefrom resulting in waste and attracting rats and other vermin.

One other difficulty incurred with prior art feeders concerns the difficulty of moving them for relocation purposes on a given range or pasture. In particular, since these units are necessarily relatively heavy in weight and of sturdy construction so as to not be easily overturned by the cattle or winds developed on open ranges, it has been difficult for a single farmer or rancher to move them for even short distances. This, of course, has limited the effectiveness of these prior art feeders as a means for inducing more uniform grazing over a given range or pasture.

In a preferred embodiment of the present invention, the feed receptacle is made from an automobile tire which has been turned inside out. In this regard, it is important to note that the applicant has discovered that by taking a conventional automobile tire and turning the same inside out, a substantially improved feed receptacle results. This unique constructional feature of the applicant's invention, when applied to livestock feeders, results in an advantageous deep-welled feed receptacle which, from experience, has been found to be unusually effective for holding mineral concentrates and other animal feeds without having the same nosed out or spilled by the livestock as they eat therefrom.

It is, therefore, an object of the present invention to provide an improved feeder for livestock and other animals which avoids the disadvantages and objections inherent in previously available range feeders.

An important object of the present invention is to provide an improved livestock feeder equipped with a specially designed feed receptacle which facilitates the feeding operation and minimizes the spilling of food by the livestock when they are eating.

Another object of the present invention is to provide an improved portable livestock feeder which is sturdily built to withstand rough treatment by livestock and strong winds without tipping over yet which can easily be moved by one man without the use of additional power means.

A further object of the present invention is to provide an improved portable livestock feeder which is equipped to be towed by an automobile, pickup truck or the like for speedy transportation to various locations on the range without incurring damage or injury to the feeder.

A still further object of the present invention is to provide an improved livestock feeder having a resiliently constructed feed receptacle which acts to prevent injury to livestock and also resists corrosion.

A further object of the present invention is to provide an improved livestock feeder having an open-bottomed feed receptacle which facilitates cleaning thereof and provides instant drainage for rain water.

Another object of the present invention is to provide an improved livestock feeder having an open top and bottom feed receptacle made from an automobile tire which has been turned inside out.

A yet further object of the present invention is to provide a livestock feeder equipped with a base having improved stabilizing means.

Other and further objects of the present invention will be apparent from the following detailed description of a preferred embodiment of the present invention in connection with the accompanying drawing wherein:

FIGURE 1 is a side elevational view of a livestock feeder embodying principles of the present invention;

FIGURE 2 is a vertical sectional view taken along the line 2—2 of FIGURE 1;

FIGURE 3 is a sectional view taken along the line 3—3 of FIGURE 1; and

FIGURE 4 is a sectional view taken along the line 4—4 of FIGURE 2.

Referring to the drawing, and with particular reference to FIGURE 1, the numeral 11 generally designates a livestock feeder embodying principles of the present invention, having a feed receptacle 12 mounted to a platform base 13 and a canopy 14 secured to a centrally disposed vertical shaft 15a, which in turn, is adjustably positioned in a stationary shaft support 15b.

In the illustrated embodiment, feeder 11 is intended to be used as a range feeder for livestock such as cattle and sheep. It is to be understood, however, that the relative size thereof can be varied in accordance with the needs of the particular animals intended to be fed.

As is best sown in FIGURES 1 and 2, feed receptacle 12 has a general pot-bellied configuration, with side wall 16 having an upper portion 16a curving radially inwardly to a bead portion 16e which defines an open end 17, and an integral lower portion 16b which tapers downwardly therefrom terminating in a radially inwardly extending rim 18 and bead portion 16f which, in turn, defines an open end 18a. Receptacle 12 may be composed of any material possessing the desired characteristics of durability and corrosion resistance, such as, for example, rubber-covered cord or plastic materials possessing similar characteristics. Outer surface 16c of the side wall is preferably rounded so as to provide a smooth surface against which the cattle will contact when they are eating from the feeder.

An important feature of the present invention involves providing feed receptacle 12 with an upper open end 17 of smaller diameter than the interior. This enables upper portion 16a of the receptacle to act as a protective rim preventing food from spilling while the cattle are eating therefrom. Another feature of this feed receptacle is that the inner and outer faces of the side wall 16c and 16d, respectively, are smooth and continuous thereby avoiding the sharp interior angles common to conventional feeders which make it difficult for the cattle to pick up the last few food particles contained therein.

Radial rim 18 is equipped with holes for receiving bolts 19 for securing feed receptacle 12 to a platform 20. As is best shown in FIGURES 1 and 2, four spacers, identified by the reference numeral 21, are sized so that they raise the open end 18a of feed receptacle 12 a sufficient height to provide drainage therethrough and at the same time also keep it low enough so that the feed particles do not escape. This constructional feature of the applicant's device has the advantage of enabling drainage along the entire peripheral bottom of the feed receptacle 12. Another important advantage of this feeder's drainage means is that it does not clog up as do drainage holes in conventional livestock feeders.

In a preferred embodiment of the present invention, the feed receptacle is made from an automobile tire which has been turned inside out. In this regard, it has been found that when a conventional automobile tire is turned inside out, it assumes a shape which generally conforms to that of feed receptacle 12 shown in FIGURES 1, 2 and 4. Accordingly, an important aspect of one embodiment of the present invention involves the discovery that automobile tires when turned inside out can be used as feed receptacles. By modifying automobile tires in this manner, a number of unexpected advantages are obtained. These include a substantially increased feed capacity (aproximately two times larger) and a side wall configuration which acts to prevent the feed contents from being nosed out or otherwise spilled by the animals as they are eating therefrom. In test devices which have been made thus far, it has been found to be substantially impossible for cattle to nose out and spill feed as they are eating from the devices constructed in accordance with this invention. The flexible side walls of the so constructed feed receptacle have the additional advantage of cushioning impact, thereby preventing bruising and injury to cattle and also preventing tipping of the device caused by livestock bumping into or rubbing against the feed receptacle.

In the embodiment illustrated in the drawing, base 13 has a pair of leg members 22 secured to platform 20 by bolts 23. Each of the leg members 22 comprises a cross bar 22a having a pair of support legs 24 integrally formed therewith. In order to provide structural stability which will be sufficient to withstand the high winds developed on ranges and to prevent tipping caused by the animals brushing against the feeder 11, it is highly desirable that the legs 24 extend to a distance which is radially outwardly disposed from the outer edge of the feed receptacle 12. In other words, structural stability is enhanced by providing a broad base. The actual dimensions will, of course, vary with the anticipated conditions. However, it has been found that a distance of between the outer limits of legs 24 equal to about twice that of the width of platform 20 is generally sufficient to provide a feeder which will remain upright under most conditions.

Since an important aspect of range feeders is that they be sufficiently portable so as to enable their movement to various locations on the grazing area, feeder 11 is equipped with a pair of skids or runners 26 which, in accordance with one aspect of the present invention are mounted to individual legs 24 of different leg members 22. This then provides a base construction which is reinforced longitudinally by the runners 26 and laterally by the cross bar portions 22a of each of the leg sections 22. Further reinforcement may be provided by means of gussets 28 composed of flat bar iron which are welded to each leg 24 and horizontal cross bar portions 22a.

Each of the tracks 26 is each provided with an upwardly curved forward section 26a in which an aperture 26b is bored for receiving the hooked end 30 of a tow bar 31. Tow bar 31 is equipped with a central looped portion 32 that can be suitably connected to a tow truck or tractor for towing the feeder at relatively high speeds. In this regard, it has been my experience that feeders can be moved at speeds at 10 m.p.h. along the range by means of a pickup truck without any injury to their structural components. At the same time runners 26 make it possible for one man to move these feeders a short distance without the assistance of additional power means. This latter feature is particularly important where it is desired to move the feeder only a few feet, such as when the livestock trample areas around the feeder which become barren and muddy when it rains.

Centrally disposed within platform 20 is a hole 20a which is sized to receive vertically mounted hollow shaft 15b. As is best sown in FIGURES 1 and 2, the lower end of shaft 15b is bolted to one arm 33a of an angle clamp 33, which clamp in turn is secured to platform 20 by a pair of bolts 36. Improved rigidity of shaft 15b can be obtained by inserting a stress-distributing block between arm 33b of the clamp and the bottom surface of platform 20.

Height adjustment for the canopy 14 is provided in the illustrated embodiment by means of a series of vertically spaced holes 38 through which bolt 39 can be positioned to furnish a support on which the lower end of shaft 15a will bottom.

Umbrella-like canopy 14 includes an inverted dish-shaped cover 40 having a plurality of radial reinforcing ribs 41 and and iron bar 42 secured to the cover by means of rivets 43. In some installations, it may be desirable to provide more than a single iron bar 42 in order to uniformly distribute the stresses which are encountered by reason of the high speed winds developed on open grazing areas. Iron bars 42 can be mounted to shaft 15a by any suitable means such as, for example, by welding.

Top cover or shade 40 may be constructed from most common metals and rigid plastics. In using metals, the lighter ones such as aluminum, and magnesium are preferred in that they are rust proof and produce a lighter cover, resulting in improved stability since the center of gravity of the feeder is then closer to the ground. The size of cover 40 will, of course, vary in accordance with the size of the feed receptacle 12. In this connection, I have found that a cover diameter of roughly twice the size of feed receptacle open end 17 is usually adequate.

In practice it is desirable to locate several of the feeders at different points on the range or pasture. The cattle soon become accustomed to these feeders and seek them out, tending to graze in the areas immediately adjacent thereto. By timely relocation of these feeders uniform grazing over the available land will be accomplished thereby making the best use of the range or pasture and, at the same time, providing the cattle with important dietary supplements.

While in the foregoing specifications, a detailed description of a specific embodiment of the present invention has been set down for purpose of explanation, it will be understood that many variations in the details thereof may be made by those skilled in the art without departing from the spirit and scope of the present invention.

I claim:

1. A livestock feeder, comprising a base having a generally planar top surface and a plurality of supporting legs extending downwardly and outwardly therefrom, an open-ended feed receptacle formed of an inside out automobile tire, the beads of said tire respectively defining a top opening and a bottom opening, said feed receptacle being mounted to said generally planar top surface with the bottom opening thereof being in parallel spaced-away relationship to said generally planar top surface, spacer means interposed between said generally planar top surface and the bottom bead of said feed receptacle, said spacer means being sized large enough to enable drainage of water from said bottom opening and small enough to prevent the escape of feed contents stored in said feed receptacle.

2. The livestock feeder of claim 1 wherein runners are mounted to said supporting legs.

3. The livestock feeder of claim 2 wherein said base is equipped with a tow bar.

4. The livestock feeder of claim 1 wherein said base is equipped with a vertically extending shaft having a canopy fixed thereto.

5. The livestock feeder of claim 4 wherein runners are mounted to said supporting legs.

References Cited

UNITED STATES PATENTS

| | | | |
|---|---|---|---|
| 192,876 | 7/1877 | Prather | 119—58 |
| 872,032 | 11/1907 | Tolle | 119—58 |
| 2,718,875 | 9/1955 | Schaubel | 119—61 |
| 2,720,862 | 10/1955 | Davis | 119—61 |
| 3,007,443 | 11/1961 | Ryan | 119—51 |

SAMUEL KOREN, *Primary Examiner.*

HUGH R. CHAMBLEE, *Examiner.*